United States Patent
Nimishakavi

[11] Patent Number: 5,907,719
[45] Date of Patent: May 25, 1999

[54] COMMUNICATION INTERFACE UNIT EMPLOYING TWO MULTIPLEXER CIRCUITS AND CONTROL LOGIC FOR PERFORMING PARALLEL-TO-SERIAL DATA CONVERSION OF A SELECTED ASYNCHRONOUS PROTOCOL

[75] Inventor: Hanumanthrao Nimishakavi, Fremont, Calif.

[73] Assignee: Cirrus Logic, Inc., Fremont, Calif.

[21] Appl. No.: 08/589,663

[22] Filed: Jan. 22, 1996

[51] Int. Cl.[6] ............................................. G06F 13/00
[52] U.S. Cl. .......................... 395/891; 395/882; 395/885
[58] Field of Search .................................. 370/366, 535;
371/25.1; 379/23, 33; 395/552, 559, 866,
500, 200.64, 891, 882, 885; 327/407; 340/870.03;
375/354

[56] References Cited

U.S. PATENT DOCUMENTS

| | | | |
|---|---|---|---|
| 3,585,586 | 6/1971 | Harmon et al. | 340/146.1 |
| 3,836,888 | 9/1974 | Boenke et al. | 395/559 |
| 3,924,181 | 12/1975 | Alderson | 371/25.1 |
| 3,965,343 | 6/1976 | Speiser et al. | 364/726.03 |
| 3,968,335 | 7/1976 | Werner et al. | 379/23 |
| 3,975,712 | 8/1976 | Hepworth et al. | 371/49.1 |
| 4,047,159 | 9/1977 | Boudry | 395/866 |
| 4,068,104 | 1/1978 | Werth et al. | 379/33 |
| 4,157,458 | 6/1979 | Roche | 370/535 |
| 4,392,221 | 7/1983 | Hesketh | 370/366 |
| 4,415,818 | 11/1983 | Ogawa et al. | 326/40 |
| 4,426,685 | 1/1984 | Lorentzen | 395/552 |
| 4,516,201 | 5/1985 | Warren et al. | 395/200.64 |
| 4,607,345 | 8/1986 | Mehta | 395/881 |
| 4,799,040 | 1/1989 | Yanagi | 341/101 |
| 4,878,215 | 10/1989 | Rogers | 370/366 |
| 4,899,339 | 2/1990 | Shibagaki et al. | 370/431 |
| 5,005,151 | 4/1991 | Kurkowski | 395/856 |
| 5,029,331 | 7/1991 | Heichler et al. | 371/43.2 |
| 5,134,702 | 7/1992 | Charych | 395/500 |
| 5,237,561 | 8/1993 | Pyhalammi | 370/244 |
| 5,287,458 | 2/1994 | Michael et al. | 395/858 |
| 5,345,198 | 9/1994 | Jacobson | 332/152 |
| 5,347,270 | 9/1994 | Matsuda et al. | 340/825.8 |
| 5,377,265 | 12/1994 | Wettengel et al. | 380/9 |
| 5,390,019 | 2/1995 | Fritze et al. | 356/350 |
| 5,550,874 | 8/1996 | Lee | 375/354 |
| 5,561,826 | 10/1996 | Davies et al. | 395/891 |
| 5,583,574 | 12/1996 | Tanaka et al. | 348/434 |
| 5,598,442 | 1/1997 | Gregg et al. | 375/354 |
| 5,625,353 | 4/1997 | Katagiri et al. | 340/870.03 |
| 5,714,904 | 2/1998 | Jeong | 327/407 |

FOREIGN PATENT DOCUMENTS 358092130A  6/1983  Japan .

Primary Examiner—Thomas C. Lee
Assistant Examiner—Chien Yuan
Attorney, Agent, or Firm—Victor H. Okumoto; Frank D. Nguyen

[57] ABSTRACT

A communication interface unit (128) facilitates data word exchanges between a parallel driven bus (210) and a serial driven communication channel (136) by performing both parallel-to-serial and serial-to-parallel data conversion functions. A transmitter circuit (200) is included in the communication interface unit (128), which performs parallel-to-serial data conversion employing a multiplexer circuit (204) and control logic circuitry (208). The multiplexer circuit (204) concurrently receives a plurality of data bits of a data word being transferred, and the control logic circuitry (208) thereupon causes the plurality of data bits of the data word to be successively passed through the multiplexer circuit (204) so as to perform parallel-to-serial conversion. A receiver circuit (300) may also be included in the communication interface unit (128), which performs serial-to-parallel data conversion employing a plurality of flip-flops (304) and control logic circuitry (308). The plurality of flip-flops (304) each receive a plurality of data bits of a data word being transferred, and the control logic circuitry (308) thereupon causes the plurality of data bits of the data word to be successively latched into the plurality of flip-flops (304) so as to perform serial-to-parallel conversion.

5 Claims, 8 Drawing Sheets

COMMUNICATION INTERFACE UNIT EMPLOYING TWO MULTIPLEXER CIRCUITS AND CONTROL LOGIC FOR PERFORMING PARALLEL-TO-SERIAL DATA CONVERSION OF A SELECTED ASYNCHRONOUS PROTOCOL

FIELD OF THE INVENTION

This invention relates in general to computer systems and in particular, to data communication circuits for computer systems which facilitate transfers of data between a parallel driven data bus and one or more serial driven communication channels.

BACKGROUND OF THE INVENTION

In a typical computer system, data may be exchanged between a memory device and one or more peripheral devices under the control of a host processor. Since memory devices generally communicate data through parallel driven data buses and peripheral devices generally communicate data through serial driven communication channels, one or more interface circuits providing parallel-to-serial and/or serial-to-parallel data conversion are required in such computer systems.

U.S. Pat. No. 3,975,712 and U.S. Pat. No. 5,287,458, which are both incorporated herein by this reference, describe such computer systems and in particular, communication interface circuits employing shift registers for performing such parallel-to-serial and serial-to-parallel conversion functions.

It is a primary object of the present invention, however, to provide a simpler and more cost effective circuit for performing such parallel-to-serial and serial-to-parallel conversion functions in a communication interface unit facilitating data transfers between a parallel drive data bus and one or more serial driven communication channels in a computer system.

SUMMARY OF THE INVENTION

This and additional objects are accomplished by the various aspects of the present invention, wherein briefly stated, one aspect of the present invention is a transmitter circuit (e.g., 200 in FIG. 2) for transmitting a data word received from a parallel driven data bus (e.g., 112 in FIGS. 1 and 2), to a peripheral device (e.g., 144 in FIG. 1) through a serial driven communication channel (e.g., 136 in FIGS. 1 and 2). Included in the transmitter circuit are a multiplexer circuit (e.g., 204 in FIG. 2) and control logic means (e.g., 208 in FIG. 2). The multiplexer circuit has a plurality of data inputs concurrently receiving corresponding data bits of the data word, a plurality of select inputs respectively connected to a plurality of control signals (e.g., 212 in FIG. 2), and an output providing a serial version of the data word to the serial driven communication channel. The control logic means generates the plurality of control signals such that the plurality of control signals cause the multiplexer circuit to pass the data bits of the data word one-at-a-time starting with a least-significant-bit of the data word and ending with a most-significant-bit of the data word.

Another aspect is a receiver circuit (e.g., 300 in FIG. 3) for receiving a data word from a serial driven communication channel (e.g., 112 in FIGS. 1 and 3), and providing the received data word to a buffer memory (e.g., 302 in FIG. 3) through a data bus (e.g., 310 in FIG. 3) having a plurality of parallel driven data lines. Included in the receiver circuit are a plurality of flip-flops (e.g., 304 in FIG. 3) and control logic means (e.g., 308 in FIG. 3). The plurality of flip-flops individually have a data input connected to the serial driven communication channel, a clock input connected to a corresponding one of a plurality control signals (e.g., 312 in FIG. 3), and a data output connected to a corresponding one of the parallel driven data lines of the data bus. The control logic means generates the plurality of control signals such that the plurality of control signals cause the plurality of flip-flops to latch corresponding data bits of the data word received from the serial driven communication channel.

Still another aspect is a computer system (e.g., 100 in FIG. 1) including a processor (e.g., 102 or 114 in FIG. 1), a memory (e.g., 104 or 116 in FIG. 1) connected to the processor through a bus (e.g., 106 or 112 in FIG. 1) having a plurality of parallel driven data lines, a peripheral device (e.g., 144–150 in FIG. 1), and a communication interface means (e.g., 128–134 in FIG. 1). The communication interface means is connected to the processor and the memory through the bus, and to the peripheral device through a serial driven communication channel (e.g., 136–142 in FIG. 1). The primary function of the communication interface means is communicate data words between the memory and the peripheral device generally under the control of the processor. Included in the communication interface means is a transmitter circuit (e.g., 200 in FIG. 2) having a multiplexer circuit (e.g., 204 in FIG. 2) and control logic means (e.g., 208 in FIG. 2). The multiplexer circuit has a plurality of data inputs concurrently receiving corresponding data bits of a data word transmitted through the bus, a plurality of select inputs respectively connected to a plurality of control signals (e.g., 212 in FIG. 2), and an output providing a serial version of the data word transmitted through the bus to the serial driven communication channel. The control logic generates the plurality of control signals such that the plurality of control signals cause the multiplexer circuit to pass the data bits of the data word transmitted through the bus one-at-a-time starting with a least-significant-bit of the data word and ending with a most-significant-bit of the data word.

Yet another aspect is a method of transmitting a data word having a plurality of data bits comprising the steps of: concurrently providing the plurality of data bits of the data word to a multiplexer circuit (e.g., 204 in FIG. 2); and successively passing the plurality of data bits of the data word through the multiplexer so as to perform parallel-to-serial conversion on the plurality of data bits of the data word.

Yet still another aspect is a method of receiving a plurality of data bits of a data word comprising the steps of: serially providing the plurality of data bits of the data word to a plurality of flip-flops (e.g., 304 in FIG. 3); and successively latching the plurality of data bits of the data word into the plurality of flip-flops so as to perform serial-to-parallel conversion on the plurality of data bits of the data word.

Additional objects, features and advantages of the various aspects of the present invention will be apparent from the following description of its preferred embodiments, which description should be taken in conjunction with the accompanying drawings.

DETAILED DESCRIPTION OF THE PREFERRED EMBODIMENTS

Figure 1:
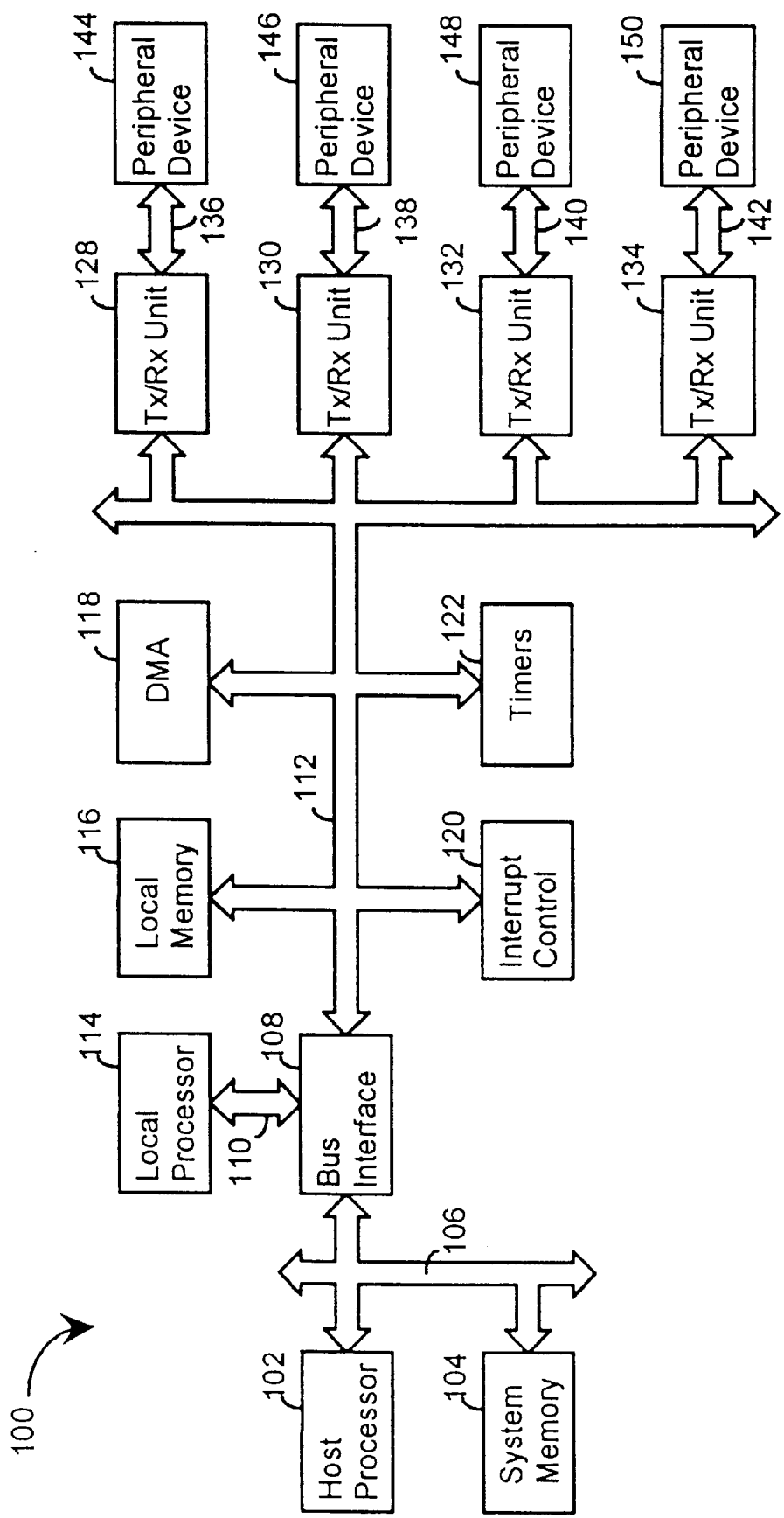
FIG. 1 illustrates, as an example, a block diagram of a computer system including one or more communication interface units utilizing aspects of the present invention.

FIG. 1 illustrates, as an example, a block diagram of a computer system 100 including at one end, a host processor 102 and a system memory 104 connected to a system bus 106 for communicating parallel transferred data, and at another end, peripheral devices 144–150 connected to corresponding serial communication channels 136–142 for communicating serially transferred data. The host processor 102 may be any one of a number of commercially available processors such as those marketed by Intel Corp. or Motorola Inc. The system memory 104 may be any one or more of a number of solid state memory devices such as DRAMs, SRAMs, or EEPROMs. The peripheral devices may be any one of a number of serially communicating devices such as a printer, a modem, or another computer system communicating with the computer system 100 through, for example, a LAN.

A bus interface 108 facilitates the communication of parallel transferred data between the system bus 106, a local processor bus 110, and a local bus 112. A local processor 114 is connected to the local processor bus 110 for off-loading certain communication control tasks from the host processor 102. A number of circuits such as, for examples, a local memory 116 for storing certain device status registers and/or data, a direct memory access (DMA) controller unit 118, an interrupt control unit 120, a timer unit 122, and a plurality of communication interface units 128–134 are connected to the local bus 112. Except for the communication interface units 128–134, each of these devices are generally of conventional design and function.

For example, the bus interface 108 preferably includes arbiter circuitry (not shown) in addition to interface circuitry (not shown) for communicating with the system bus 106, the local processor bus 110, and the local bus 112. The local processor 114 preferably includes its own on-chip program ROM and data RAM to perform a number of tasks including programming communication interface units 128–134 to transmit data with selected protocols, performing certain buffer management functions such as maintaining a data buffer pool in the system memory 104 or the local memory 116, setting up the DMA controller unit 118 to transfer data in either direction between the data buffer pool and the input/output data buffer 124, and responding to certain interrupts such as those generated in response to the data buffer pool being full or empty. Additionally, the local processor 114 may also perform compression/decompression of outgoing/incoming data frames, and data encryption/decryption tasks. The local memory 116 preferably includes a number of memory mapped registers such as device status registers for the system memory 104, the local memory 116, the DMA controller unit 118, the interrupt control unit 120, the timer unit 122, the communication interface units 128–134, and the serial communication channels 136–142.

The communication interface units 128–134 operate in conjunction with the DMA controller unit 118 and the local processor 114 to transmit data frames stored in the data buffer pool of the system memory 104 or the local memory 116 to the peripheral devices 144–150, and to receive data frames from the peripheral devices 144–150 and store them in the data buffer pool of the system memory 104 or the local memory 116. Each communication interface unit (e.g., 128) is preferably dedicated to servicing a corresponding serial communication channel (e.g., 136). Each serial communication channel (e.g., 136), however, may or may not be dedicated to servicing a corresponding peripheral device (e.g., 144).

Figure 2:
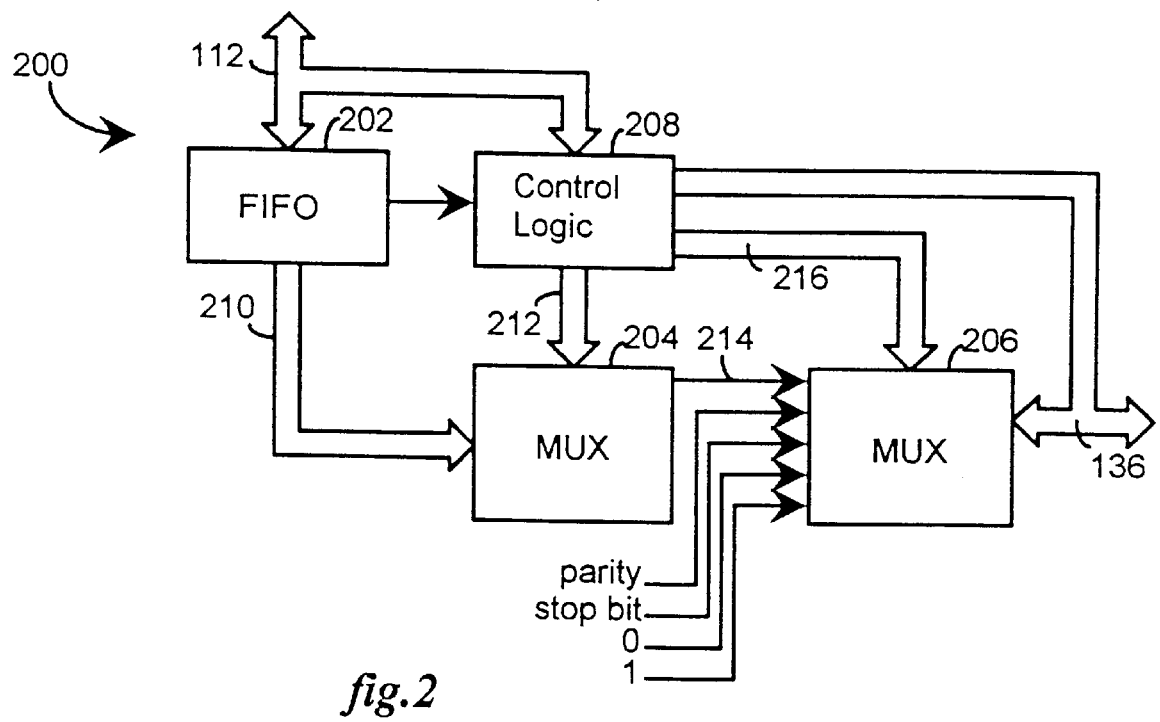
FIG. 2 illustrates, as an example, a block diagram of a transmitter circuit utilizing aspects of the present invention, which is included in one of the communication interface units of FIG. 1.
Figure 3:
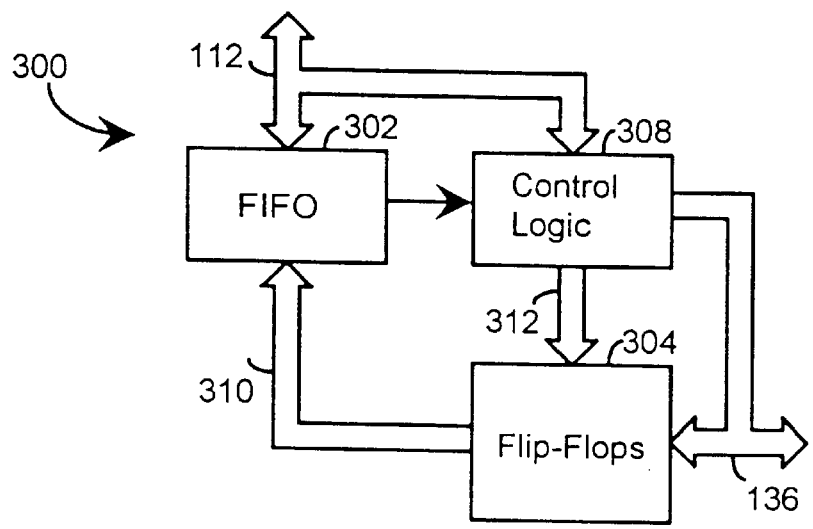
FIG. 3 illustrates, as an example, a block diagram of a receiver circuit utilizing aspects of the present invention, which is included in one of the communication interface units of FIG. 1.

Included in each of the communication interface units 128–134 are a transmitter circuit (e.g., 200 in FIG. 2) and a receiver circuit (e.g., 300 in FIG. 3). The transmitter circuit, when enabled, receives parallel transferred data from the data buffer pool in the system memory 104 or the local memory 116, converts the parallel received data into a stream of serial data of a selectable asynchronous protocol, and transmits the stream of serial data of the selectable asynchronous protocol to a peripheral device connected to the serial communication channel corresponding to the communication interface unit. The transmitter circuit may be enabled, for example, by either the host processor 102 or the local processor 114. The receiver circuit, on the other hand, receives serially transferred data of a given asynchronous protocol from a peripheral device connected to the serial communication channel corresponding to the communication interface unit, converts the serially received data of the given asynchronous protocol into typically, byte-wide words of data, and transmits, when enabled, the words of data to the data buffer pool in the system memory 104 or the local memory 116. Since the communication interface units 128–134 communicate on one side by parallel data transfers with the local bus 112, and communicate on another side by serial data transfers with corresponding serial communication channels, the transmit and receive circuits within the communication interface units 128–134 respectively preferably include parallel-to-serial and serial-to-parallel data conversion means.

FIG. 2 illustrates, as an example, a block diagram of a transmitter circuit 200 included in the communication interface unit 128. The transmitter circuit 200 comprises a FIFO memory 202 or other buffering means for buffering data received from the data buffer pool in the system memory 104 or the local memory 116 via local bus 112, a multiplexer circuit 204 for performing parallel-to-serial conversion on data output from the FIFO memory 202, a second multiplexer circuit 206 for adapting the serial data output from the multiplexer circuit 204 to a selected protocol, and control logic circuitry 208. The control logic circuitry 208 controls the flow of data into and out of the FIFO memory 202 by generating appropriate interrupt signals or setting appropriate flags such as one or more indicating that the FIFO memory 202 is empty or full, and controls the transmission of data to the peripheral device 144 by generating appropriate protocol signals such as one or more indicating that the transmitter circuit 200 is ready or not ready to transmit data. In addition, the control logic circuitry 208 generates control signals 212 to control the multiplexer circuit 204, and generates control signals 216 to control the second multiplexer circuit 206. Identical transmitter circuits such as transmitter circuit 200 are preferably included in each of the other communication interface units 130–134.

FIG. 3 illustrates, as an example, a block diagram of a receiver circuit 300 included in the communication interface unit 128. The receiver circuit 300 comprises a FIFO memory 302 or other buffering means for buffering data to be transmitted to the data buffer pool in the system memory 104 or the local memory 116 via local bus 112, a plurality of flip-flops 304 for performing serial-to-parallel conversion on data received from peripheral device 144 via serial communication channel 136, and control logic circuitry 308. The control logic circuitry 308 controls the flow of data to and from the FIFO memory 302 by generating appropriate interrupt signals or setting appropriate flags such as one or more indicating that the FIFO memory 302 is ready or not ready to be read, and controls the flow of data from peripheral device 144 via serial communication channel 136 by generating appropriate protocol signals such as one or more indicating that the receiver circuit 300 is ready or busy. In addition, the control logic circuitry 308 generates control signals 312 to control the plurality of flip-flops 204 to perform serial-to-parallel conversion. Identical receiver circuits such as receiver circuit 300 are also preferably included in each of the other communication interface units 130–134.

Figure 4:
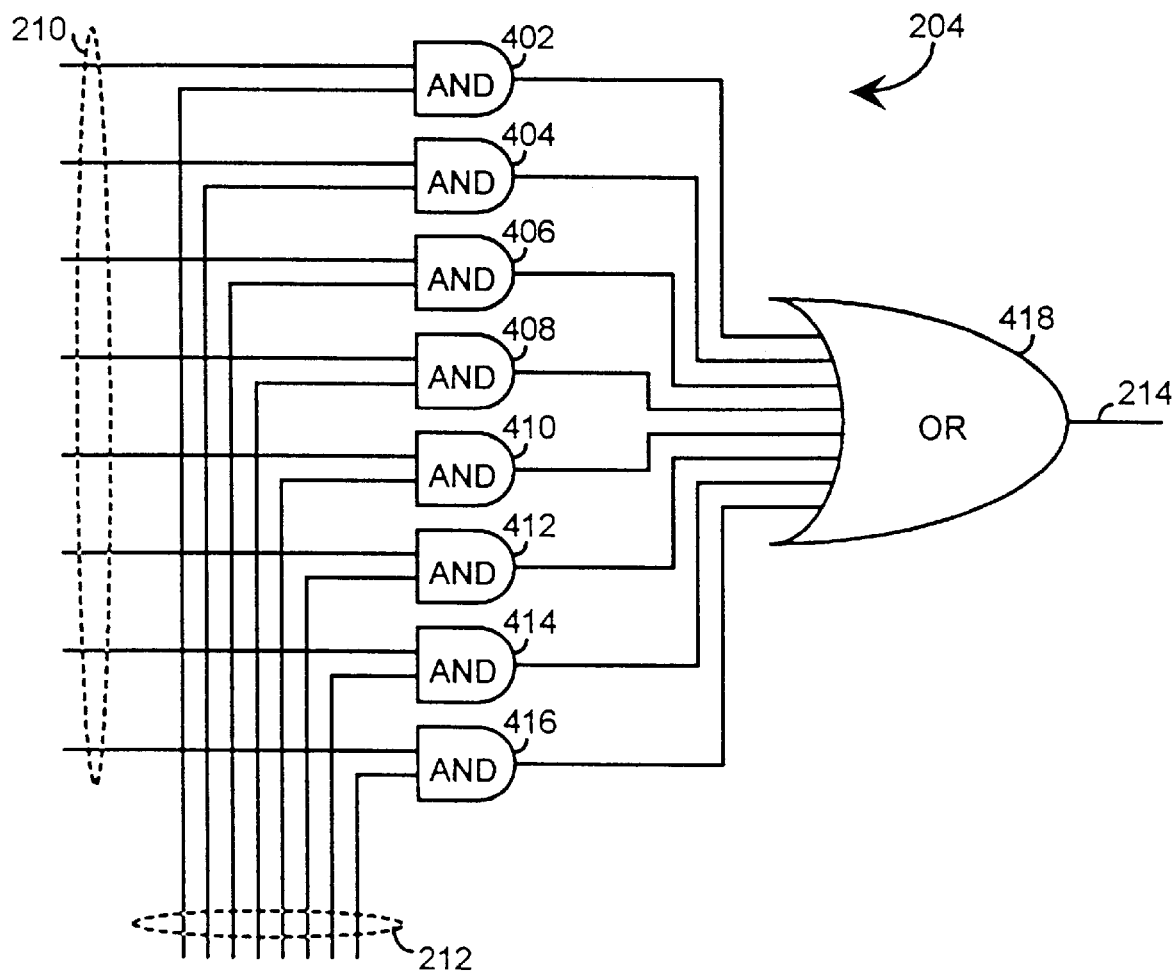
FIG. 4 illustrates, as an example, a logic diagram of a multiplexer circuit which is included in the transmitter circuit of FIG. 2 for performing parallel-to-serial conversion.

FIG. 4 illustrates, as an example, a logic diagram of the multiplexer circuit 204. Included in the multiplexer circuit 204 are a plurality of AND gates 402–416, and a single OR gate 418. Each of the AND gates 402–416 receives a corresponding bit of a data word being parallel transferred from the FIFO memory 202 along word-wide data bus 210, and a corresponding one of the control signals 212 generated by the control logic circuitry 208. The OR gate 418 receives each of the outputs of the AND gates 402–416, and provides a serially converted version of the data word to the second multiplexer circuit 206 via serial line 214. The multiplexer circuit 204 performs parallel-to-serial conversion on the data word received from the FIFO memory 202 in response to the control signals 212-1 to 212-8 (cumulatively referred to herein as 212) generated by the control logic circuitry 208, as depicted and described in reference to FIG. 7, and provided by the control logic circuitry 208 to corresponding ones of the AND gates 402–416. As can be readily appreciated by those skilled in the art of integrated circuit logic design, the multiplexer circuit 204 generally requires fewer transistors for its implementation than a conventional shift register such as those commonly used for parallel-to-serial data conversion. Therefore, the transmitter circuit 200 employing the multiplexer circuit 204 for performing parallel-to-serial conversion may be implemented in a smaller integrated circuit die than its conventional counterpart, thereupon resulting in manufacturing cost savings.

Figure 5:
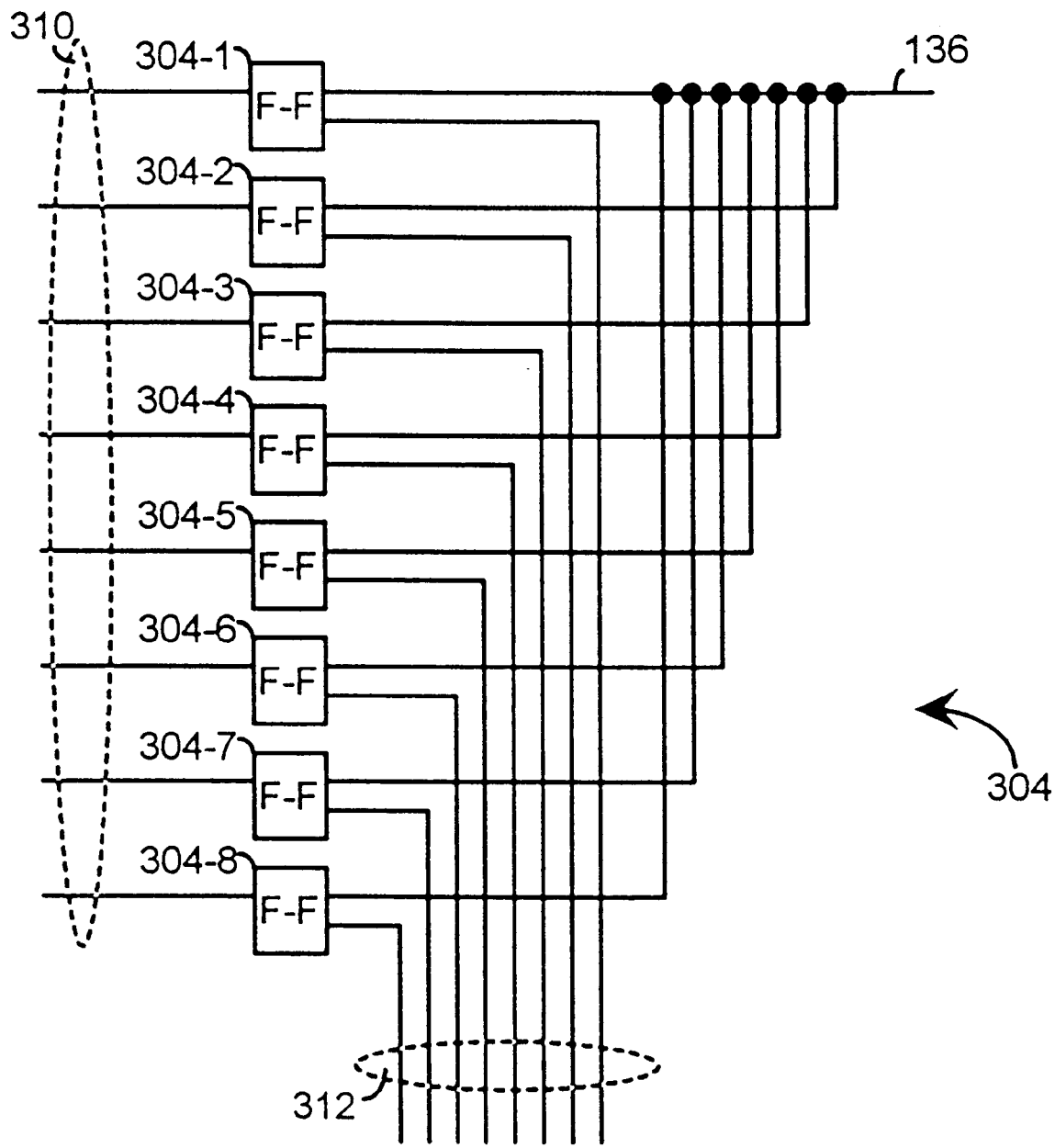
FIG. 5 illustrates, as an example, a connection diagram for a plurality of flip-flops which are included in the receiver circuit of FIG. 3 for performing parallel-to-serial conversion.

FIG. 5 illustrates, as an example, a connection diagram for flip-flops 304-1 to 304-8 (cumulatively referred to herein as the plurality of flip-flops 304) included in the receiver circuit 300 for performing serial-to-parallel conversion. Each of the plurality of flip-flops 304 has a D-input connected to the serial communication channel 136, and a clock input connected to one of the control signals 312. The plurality of flip-flops 304 perform serial-to-parallel conversion on serialized data words being received from the peripheral device 144 through the serial communication channel 136 in response to the control signals 312-1 to 312-8 (cumulatively referred to herein as 312) generated by the control logic circuitry 308, as depicted and described in reference to FIG. 9, and provided by the control logic circuitry 308 to corresponding ones of the plurality of flip-flops 304.

Figure 6:
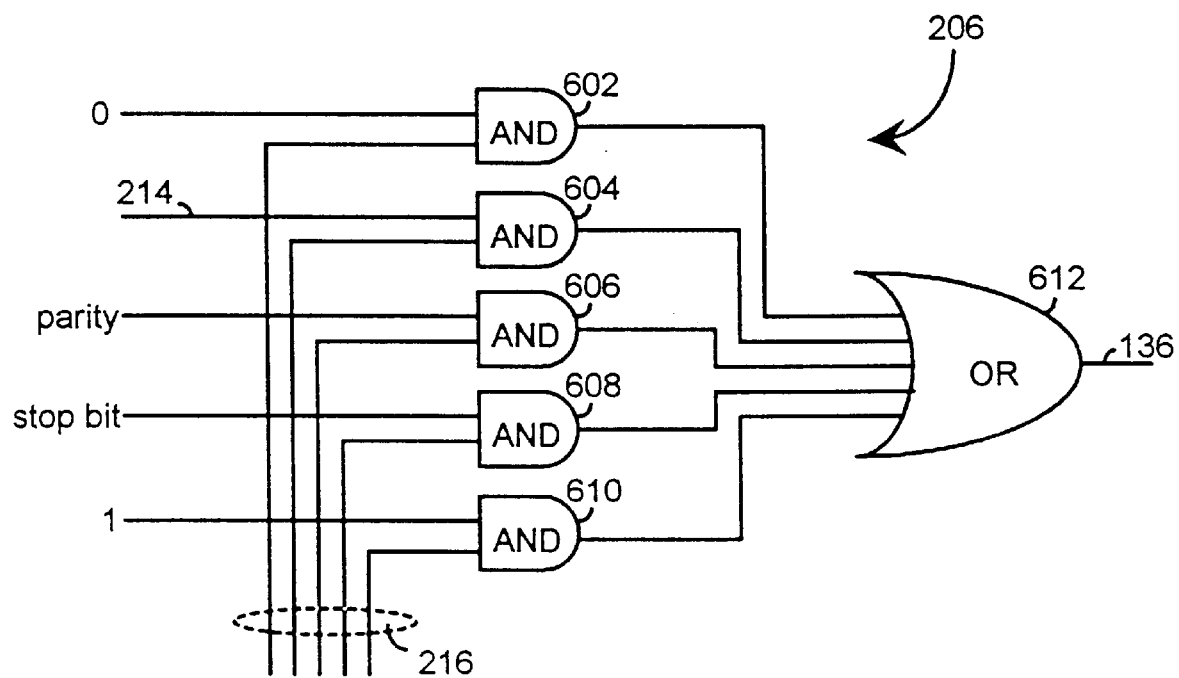
FIG. 6 illustrates, as an example, a logic diagram of a second multiplexer circuit which is included in the transmitter circuit of FIG. 2 for adapting a data word being transmitted to a selected asynchronous protocol.

FIG. 6 illustrates, as an example, a logic diagram of a second multiplexer circuit 206 included in the transmitter circuit 200 for adapting a serialized data word to a selected asynchronous protocol before transmitting the serialized data word to the peripheral device 144 through the serial communication channel 136. Included in the second multiplexer circuit 206 are a plurality of AND gates 602–610, and a single OR gate 612. AND gate 602 receives a start bit "0" at a first input, and a corresponding one (e.g., 216-1) of the control signals 216 at a second input. AND gate 604 receives serialized data via line 214 from the multiplexer circuit 204 at a first input, and a corresponding one (e.g., 216-2) of the control signals 216 at a second input. AND gate 606 receives a parity bit at a first input, and a corresponding one (e.g., 216-3) of the control signals 216 at a second input. AND gate 608 receives a stop bit at a first input, and a corresponding one (e.g., 216-4) of the control signals 216 at a second input. AND gate 610 receives a line inactive "1" at a first input, and a corresponding one (e.g., 216-5) of the control signals 216 at a second input. The OR gate 612 receives each of the outputs of the AND gates 602–610. By the control logic circuitry 208 generating control signals 216-1 to 216-5 (cumulatively referred to herein as 216) such as depicted and described in reference to FIG. 8, the OR gate 612 provides the serialized data word with the selected asynchronous protocol to the peripheral device 144 through the serial communication channel 136.

Figure 7:
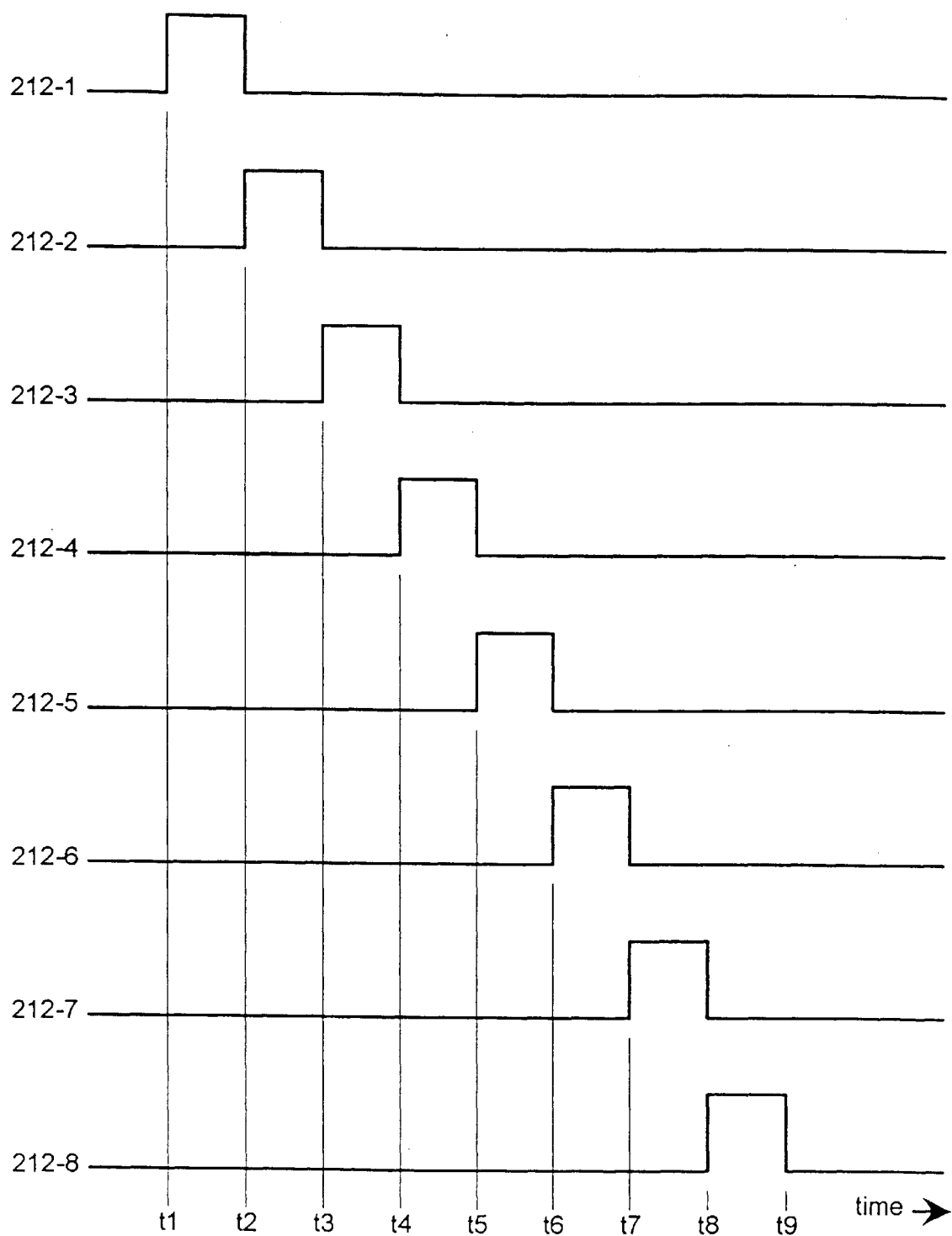
FIG. 7 illustrates, as examples, timing diagrams for a plurality of control signals provided to the multiplexer circuit of FIG. 4 for performing parallel-to-serial conversion.

FIG. 7 illustrates, as examples, timing diagrams for the control signals 212 generated by the control logic circuitry 208, and provided by the control logic circuitry 208 to the multiplexer circuit 204 for performing parallel-to-serial conversion of a data word provided along word-wide data bus 210 to the multiplexer circuit 204. At time t1, the control signal 212-1 provided to AND gate 402 is HIGH while remaining control signals, 212-2 to 212-8, provided to AND gates 404–416 are LOW, and as a consequence, the least-significant-bit of the data word provided to AND gate 402 along word-wide data bus 210, is passed through the OR gate 416. At time t2, the control signal 212-2 provided to AND gate 404 is HIGH while the other control signals, 212-1 and 212-3 to 212-8, provided to AND gates 402 and 406–416 are LOW, and as a consequence, the next least-significant-bit of the data word provided to AND gate 404 along word-wide data bus 210, is passed through the OR gate 416. In a similar fashion, at times t3 to t8, the control signals 212-3 to 212-8 sequentially go HIGH while other control signals are LOW, so that each of the bits of the data word, from the least-significant-bit to the most-significant-bit, are sequentially passed through the OR gate 416, and as a result, parallel-to-serial conversion of the data word being received along the word-wide data bus 210 is accomplished.

A number of circuits may readily be designed by persons skilled in the art of integrated circuit logic design for generating the control signals 212-1 to 212-8. As merely one example, the control signals 212-1 to 212-8 may be generated by providing a pulse signal to a chain of seven flip-flops (i.e., a Q-output of an nth flip-flop serves as a D-input of an (n+1)th flip-flop) driven by a common clock signal having a period equal to, for example, the difference between times t2 and t1, wherein the control signal 212-1 is the pulse signal, the control signal 212-2 is the output of the first flip-flop in the chain of flip-flops, the control signal 212-3 is the output of the second flip-flop in the chain of flip-flops, and so on to the control signal 212-8 which is the output of the seventh flip-flop.

Figure 8:
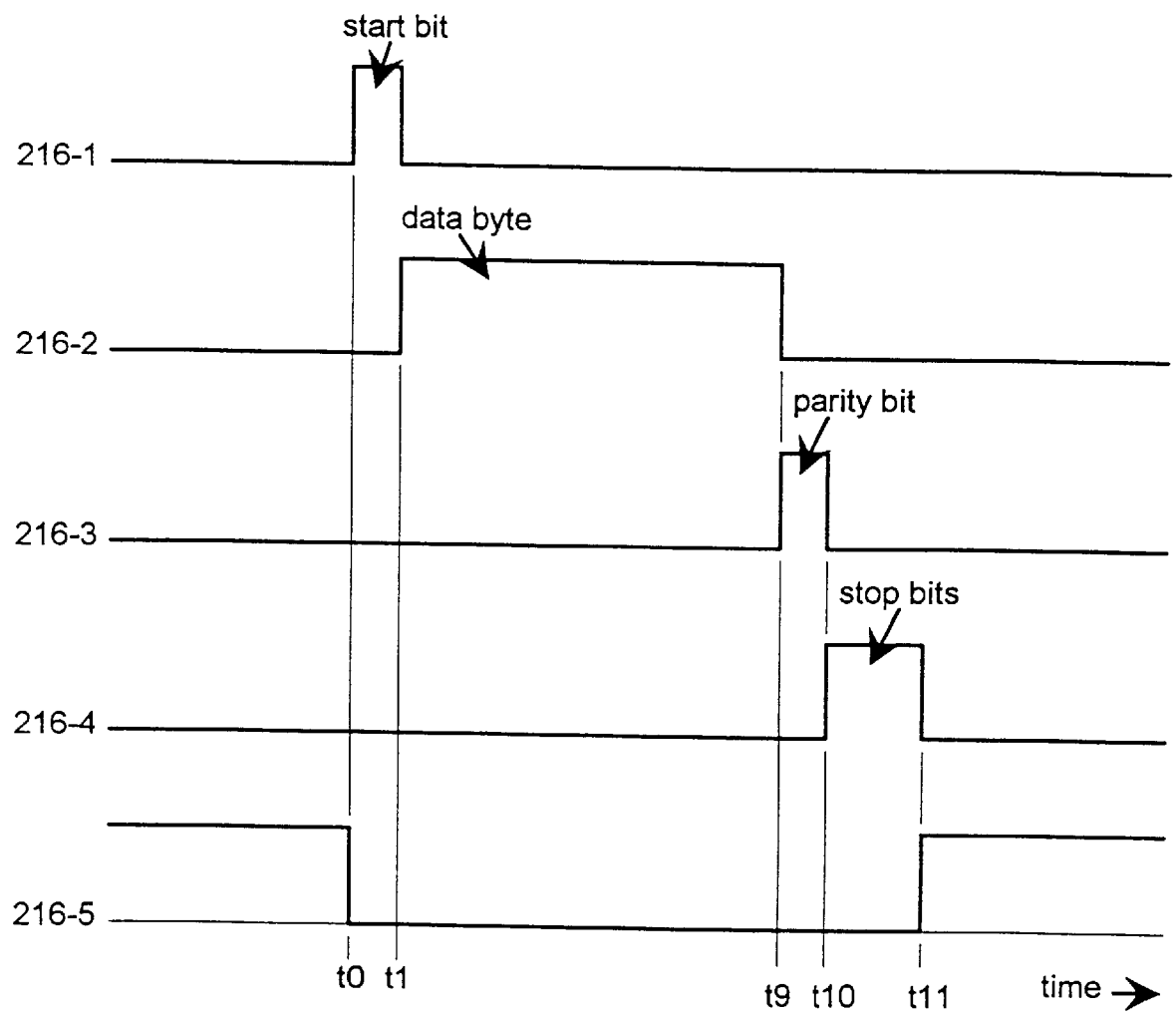
FIG. 8 illustrates, as examples, timing diagrams for a second plurality of control signals provided to the second multiplexer circuit of FIG. 6 for adapting a data word being transmitted to a selected asynchronous protocol.

FIG. 8 illustrates, as examples, timing diagrams for the control signals 216 provided to the second multiplexer circuit 206 for adapting a serialized data word received from the multiplexer circuit 204 via line 214 to a selected asynchronous protocol. Prior to time t0, the control signal 216-5 provided to AND gate 610 is held HIGH while the other control signals, 216-1 to 216-4, are LOW, so that the output of the OR gate 612 is a "1" indicating that nothing is being transmitted at the time. At time t0, transmission of a data word is initiated by the control signal 216-1 provided to AND gate 602 going HIGH while the other control signals, 216-2 to 216-5, are LOW, so that the output of the OR gate 612 is a start bit "0" indicating that transmission of a data word follows. Between times t1 and t9, the control signal 216-2 provided to AND gate 604 goes and stays HIGH while the other control signals, 216-1 and 216-3 to 216-5, are LOW, so that the output of the OR gate 612 is the serialized data word received by AND gate 604 along line 214 from the multiplexer circuit 204. At time t9, the control signal 216-3 provided to AND gate 606 goes HIGH while the other control signals, 216-1, 216-2, 216-4, and 216-5, are LOW, so that the output of the OR gate 612 is a parity bit provided to AND gate 606 by conventional means. Between times t10 and t11, the control signal 216-4 provided to AND gate 608 goes and stays HIGH while the other control signals, 216-1 to 216-3 and 216-5, are LOW, so that the output of the OR gate 612 provides one or more stop bits indicating the end of transmission of a data word. Finally, starting at time t11, the control signal 216-5 provided to AND gate 610 is once again held HIGH while the other control signals, 216-1 to 216-4, are LOW, so that the output of the OR gate 612 is a "1" indicating that nothing is being transmitted. As with the generation of the control signals 212-1 to 212-8, a number of circuits may readily be designed by persons skilled in the art of integrated circuit logic design for generating the control signals 216-1 to 216-5.

Figure 9:
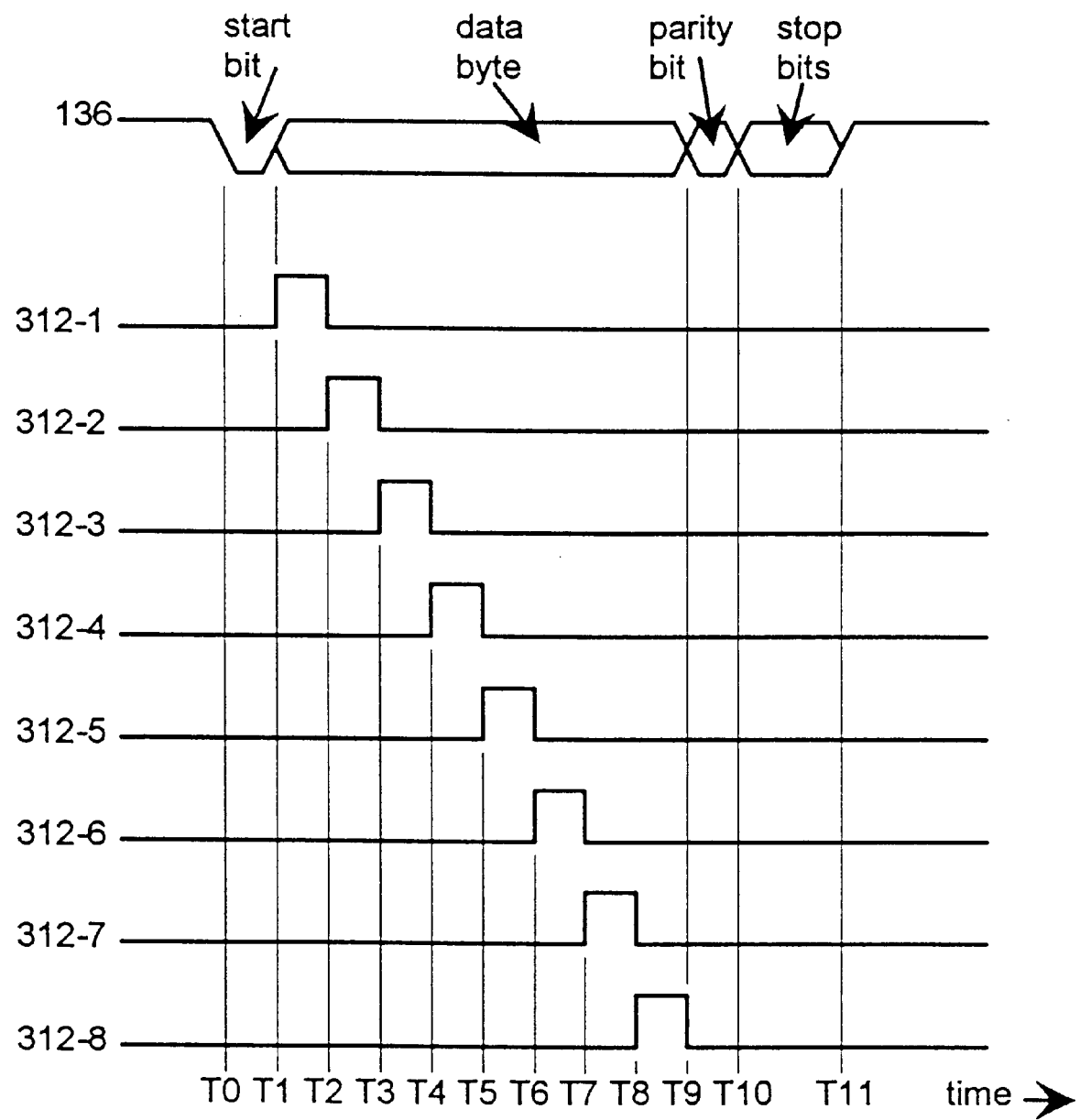
FIG. 9 illustrates, as examples, timing diagrams for a plurality of control signals provided to the plurality of flip-flops of FIG. 5 for performing serial-to-parallel conversion.

FIG. 9 illustrates, as examples, timing diagrams for the control signals 312 provided to the flip-flops 304 for performing serial-to-parallel conversion of data words. The connections and control of the flip-flops 304 are simplified by knowing in advance the asynchronous protocol of the incoming data words. If the protocol of the incoming data words are not known in advance, then additional circuitry (not shown) would be required to make such determination.

Prior to time T0, the serial communication channel 136 is held HIGH to indicate that no data is being transmitted at the time from the peripheral device 144. At time T0, a start bit "0" is transmitted from the peripheral device 144 to indicate that a data word follows. The control logic circuitry 308 detects the start bit "0" received over the serial communication channel 136, and generates the control signals 312 in a similar fashion that its transmitter circuit 200 counterpart, control logic circuitry 208 generates the control signals 212. At time T1, the control signal 312-1 provided to the clock input of flip-flop 304-1, goes HIGH while the other control signals, 312-2 to 312-8, are LOW, so that the first data bit being serially transferred from the peripheral device 144 through the serial communication channel 136 is latched into and provided at the Q-output of the flip-flop 304-1. Since the data word is typically serially transferred starting with the least-significant-bit and ending with the most-significant-bit of the data word, the first data bit being latched into the flip-flop 304-1 is typically the least-significant-bit of the data word. In a similar fashion, at times T2 to T8, the control signals 312-2 to 312-8 sequentially go HIGH while other control signals are LOW, so that each of the bits of the data word, from the least-significant-bit to the most-significant-bit, are sequentially latched into a corresponding one of the flip-flops 304. At time T9, the control logic circuitry 308 reads a parity bit received at the end of the data word, and preferably checks the parity bit against the data word now latched into the flip-flops 304 to confirm that the data word has been properly received. At time T10, the control logic circuitry 308 then detects one or more stop bits from the serial communication channel 136. If the parity bit received matches a parity bit calculated by the control logic circuitry 308, then the control logic circuitry 308 enables the FIFO 302 to latch the Q-outputs of the flip-flops 304 into its stack register. On the other hand, if the parity bit received does not match the parity bit calculated by the control logic circuitry 308, then the control logic circuitry 308 transmits an error indication back to the peripheral device 144, so that the peripheral device 144 can resend the data word. The resent and new data words are thereupon handled in the same fashion as previously described.

Although the various aspects of the present invention have been described with respect to preferred embodiments, it will be understood that the invention is entitled to full protection within the full scope of the appended claims.

I claim:

1. A circuit for converting a data word received from a parallel driven data bus into a stream of serial data of a selectable asynchronous protocol, comprising:

a first multiplexer circuit having a plurality of inputs concurrently receiving corresponding data bits of a data word, a plurality of select inputs coupled to a first plurality of control signals, and an output;

a second multiplexer circuit having a first input coupled to said first multiplexer circuit output, a plurality of inputs respectively coupled to corresponding asynchronous protocol parameters, a plurality of select inputs coupled to a second plurality of control signals, and an output; and control logic for generating said first and second control signals such that a stream of serial data of a selected asynchronous protocol is produced at said second multiplexer circuit output.

2. The circuit according to claim 1, wherein said first multiplexer circuit comprises:

a first plurality of AND gates individually having a first input receiving a corresponding data bit of said data word, a second input coupled to a corresponding one of said first plurality of control signals, and an output; and a first OR gate having a plurality of inputs respectively coupled to corresponding outputs of said first plurality of AND gates, and an output.

3. The circuit according to claim 1 or 2, wherein said second multiplexer circuit comprises:

an AND gate having an input coupled to said first OR gate output, and an output;

a second plurality of AND gates individually having a first input coupled to a corresponding one of said asynchronous protocol parameters, a second input coupled to a corresponding one of said second plurality of control signals, and an output; and a second OR gate having a plurality of inputs respectively coupled to corresponding outputs of said AND gate and said second plurality of AND gates, and an output.

4. The circuit according to claim 3, wherein said asynchronous protocol parameters include a 0 bit, a 1 bit, a parity bit, and a stop bit.

5. A computer system comprising:

a processor;

a memory coupled to said processor;

a peripheral device; and a circuit coupled to said memory through a parallel driven data bus and to said peripheral device through a serial driven communication channel, said circuit comprising:

a first multiplexer circuit having a first plurality of inputs concurrently receiving corresponding data bits of a data word provided on said parallel driven data bus, a first plurality of select inputs coupled to a first plurality of control signals, and a first output;

a second multiplexer circuit having an input coupled to said first multiplexer circuit output, a second plurality of inputs respectively coupled to corresponding asynchronous protocol parameters, a second plurality of select inputs coupled to a second plurality of control signals, and a second output; and control logic for generating said first and second control signals such that a stream of serial data of a selected asynchronous protocol is produced at said second output.

* * * * *